United States Patent
Goodwin et al.

(10) Patent No.: US 8,345,068 B1
(45) Date of Patent: *Jan. 1, 2013

(54) IMAGE-BASED DOCUMENT DISPLAY

(75) Inventors: Robert L. Goodwin, Mercer Island, WA (US); David Zhao, Bothell, WA (US); Adrian Tsang Kwong Chan, Bellevue, WA (US); Chieh Wang, Issaquah, WA (US); Michael V. Rykov, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 119 days.

This patent is subject to a terminal disclaimer.

(21) Appl. No.: 12/696,025

(22) Filed: Jan. 28, 2010

Related U.S. Application Data

(63) Continuation of application No. 11/540,116, filed on Sep. 29, 2006, now Pat. No. 7,667,719.

(51) Int. Cl.
*G09G 5/00* (2006.01)
(52) U.S. Cl. .......................... 345/684; 345/173; 715/784
(58) Field of Classification Search ........... 345/682–688
See application file for complete search history.

(56) References Cited

U.S. PATENT DOCUMENTS

| 4,873,514 | A | 10/1989 | Nakagawa | |
|---|---|---|---|---|
| 6,956,591 | B2 | 10/2005 | Lundin | |
| 7,312,785 | B2 * | 12/2007 | Tsuk et al. | 345/156 |
| 2003/0099364 | A1 * | 5/2003 | Thompson et al. | 381/14 |
| 2004/0125088 | A1 * | 7/2004 | Zimmerman et al. | 345/173 |
| 2004/0203959 | A1 * | 10/2004 | Coombes | 455/466 |
| 2004/0217980 | A1 * | 11/2004 | Radburn et al. | 345/672 |
| 2005/0257166 | A1 | 11/2005 | Tu | |

* cited by examiner

*Primary Examiner* — Xiao M. Wu
*Assistant Examiner* — Scott E Sonners
(74) *Attorney, Agent, or Firm* — Knobbe, Martens, Olson & Bear LLP

(57) ABSTRACT

The present invention is directed to a method and system for continuously displaying image pages of digital content which are available over a network. More specifically, the method and system enables a user to view image pages in a continuous manner while a limited number of image pages are being downloaded at a given time. Several image pages which are adjacent to the image page(s) the user is currently viewing may be stored in temporary memory. The image pages in the temporary memory are utilized so that, within the image pages, the user can move the displayed image pages up and down without experiencing any discontinuation. In order to ensure continuous display throughout the entire digital content, the next possible set of image pages is constantly determined and obtained to update the current set of image pages in the temporary memory.

27 Claims, 10 Drawing Sheets

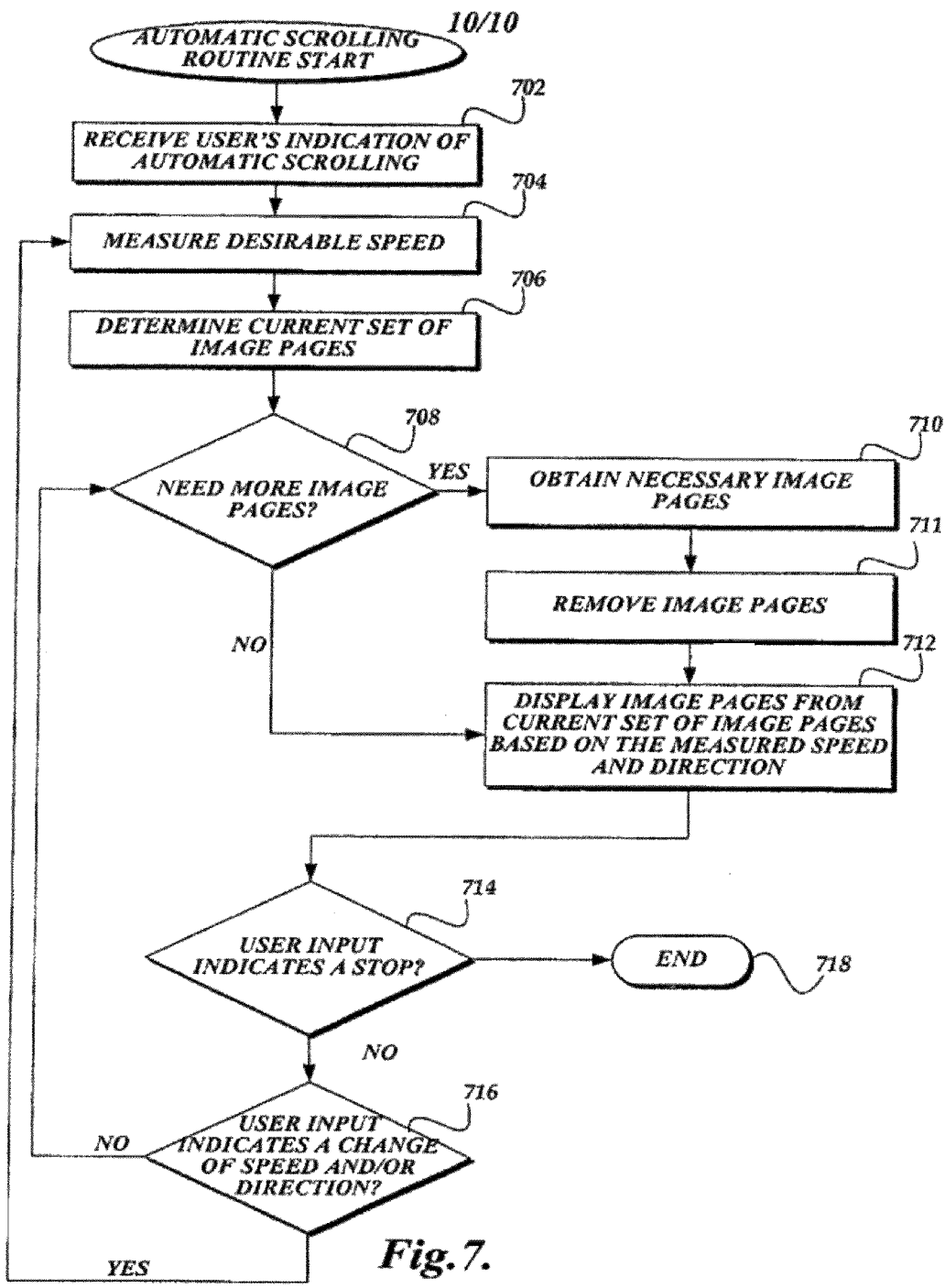

IMAGE-BASED DOCUMENT DISPLAY

CROSS-REFERENCE TO RELATED APPLICATION

This application is a continuation of U.S. patent application Ser. No. 11/540,116, entitled "IMAGE-BASED DOCUMENT DISPLAY", and filed on Sep. 29, 2006, the entirety of which is incorporated herein by reference.

BACKGROUND

As the use of computers and computer-based networks continues to expand, content providers are preparing and distributing more and more content in electronic form. This content includes traditional media such as books, magazines, newspapers, newsletters, manuals, guides, references, articles, reports, documents, etc., that exist in print, as well as electronic media in which the aforesaid content exists in digital form or is transformed from print into digital form. The Internet, in particular, has facilitated the wider publication of digital content through downloading and display of images of digital content. As data transmission speeds increase, more and more images of pages of digital content are becoming available online. A page image allows a reader to see the page of content as it would appear in print.

However, while simply providing an image (or images) of digital content can be easily facilitated, images corresponding to the conversion of pages of a book into electronic form may not be well suited in some viewing scenarios. Typically, users want to have a reading experience of the digital images of a book that is close to or better than a reading experience of the print form of the book. It is also true that users want to read the digital images of the book without significant delay or discomfort. In current typical embodiments, the data transmission speeds of digital images of a book may be restricted by a bandwidth of a network. Consequently, only limited portions of the digital images of a book are downloaded at a time and displayed via the web browser. This approach may be useful to evenly distribute downloading time among many users and allocate a fraction of the bandwidth to each user. However this approach also poses some problems. For example, there can be a significant lag time (a delay between downloading each portion of the digital images), which will cause discomfort for the user. Further, within the display window, the movement from one portion to another of the displayed digital image can be halted for a moment if the selected portion has not yet been downloaded.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Generally described, the present invention is directed to a method and system for continuously displaying image pages of digital content which are available over a network. More specifically, the method and system enables a user to view image pages in a continuous manner while a limited number of image pages are being downloaded at a given time. Several image pages which are adjacent to the image page the user is currently viewing may be stored in temporary memory. The image pages in the temporary memory are utilized so that, within the image pages, the user can move the displayed pages up and down without experiencing any discontinuation. In order to ensure continuous display throughout the entire digital content, the next possible set of image pages is constantly determined and obtained to update the image pages in the temporary memory.

In accordance with one aspect of the present invention, a method for continuously displaying image pages of digital content which are available over a network is provided. A computing device may display a current set of image pages from digital content via a web browser. Initially, the current set of image pages may include a first portion of the digital content. The computing device detects a scroll movement over a web browser window. In response to the detection of the scroll movement, the computing device may identify additional image pages to make the current set of image pages, retrieve the additional pages and update the current set of image pages by including the additional image pages. Portions of the current set of image pages may be displayed according to the scroll movement.

In an aspect of the method, rather than download and display each intervening page, a task which would take a great deal of time, the computing device can estimate the number of pages to be skipped based on the user's chosen scrolling speed. For example, when pages are being scrolled past, or "skipped," such as when the user wants to proceed rapidly to a page further along in the document, the computing device can estimate the number of pages to skip and not download or display those pages. Alternatively, the number of pages to be skipped can be estimated based on a predetermined threshold. The new image pages may be determined when the user's chosen scrolling speed slows down or stops.

Finally, according to other aspects of the invention, a computer implemented method, a display system, and a computer-accessible medium for continuous display of image pages that are available over a network are also provided.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 7 is a flow diagram of an automatic scrolling routine in accordance with an embodiment of the present invention.

DETAILED DESCRIPTION

Figure 1:
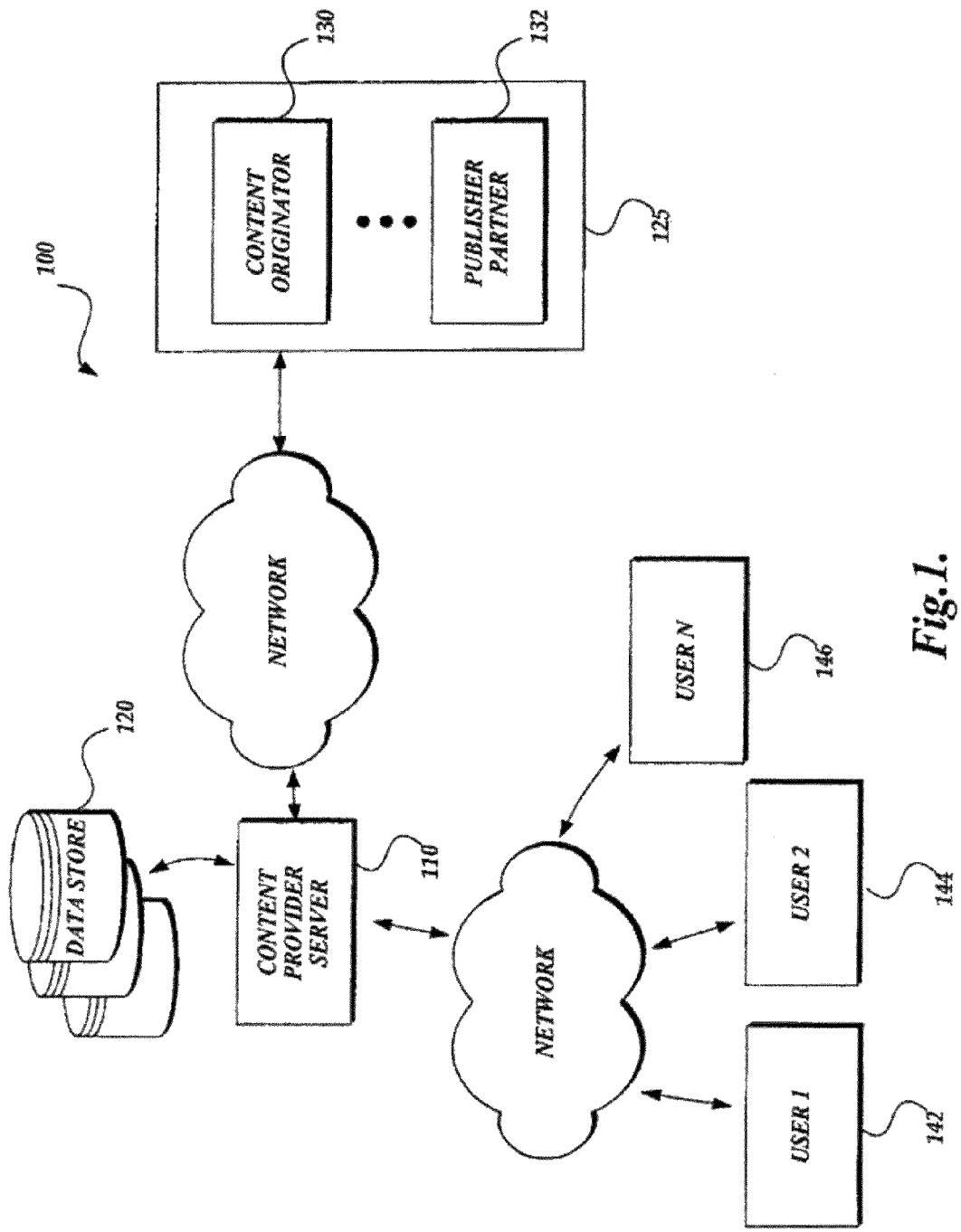
FIG. 1 is a pictorial diagram showing an exemplary computing environment in which embodiments of the present invention may be implemented.

Generally described, the present invention relates to a method and system for continuously displaying image pages of digital content which are available over a network. More specifically, the present invention relates to a method and system for enabling a user to view image pages in a continuous manner while a limited number of image pages are being downloaded at a given time. Additionally, the present invention can relate to smooth "scroll movement" in a user interface window such as a web browser window. "Scroll movement" as used herein, refers to user interaction indicating movement from a portion of one image page to a portion of another image page displayed on a user interface window. The user can implement the scroll movement to view image pages which precede or follow from the currently displayed image page. Regardless of the size of the digital content file, the user can view a continuous stream of the digital content page by page as the user scrolls.

The following detailed description describes exemplary embodiments of the invention. Although specific system configurations, screen displays, and flow diagrams are illustrated, it should be understood that the examples provided are not exhaustive and do not limit the present invention to the precise forms and embodiments disclosed. It should also be understood that the following description is presented largely in terms of logic operations that may be performed by conventional computer components. These computer components, which may be grouped at a single location or distributed over a wide area on a plurality of devices, generally include computer processors, memory storage devices, display devices, input devices, etc. In circumstances where the computer components are distributed, the computer components are accessible to each other via communication links.

In the following description, numerous specific details are set forth in order to provide a thorough understanding of the invention. However, it will be apparent to one skilled in the art that the invention may be practiced without some or all of these specific details. In other instances, well-known process steps have not been described in detail in order not to unnecessarily obscure the invention.

The exemplary networked environment 100 includes one or more user devices, such as user devices 142-146, by which a user (not shown) can view digital images. The user devices 142-146 communicate with a content provider server 110 which is responsible for providing digital images of content to user devices 142-146 via a network. User devices, such as user devices 142-146, are typically computing devices, including a variety of configurations or forms such as, but not limited to, laptop or tablet computers, personal computers, personal digital assistants (PDAs), hybrid PDA/mobile phones, mobile phones, workstations, and the like. While illustrative embodiments have been illustrated and described, it will be appreciated that various changes can be made therein without departing from the spirit and scope of the invention. In one embodiment, the user devices 142-146 can also be connected to a content provider server 110 via a communication network, such as a Local Area Network (LAN) or a Wide Area Network (WAN). In an alternative embodiment, any user device 142-146 can be a standalone user device configured to implement offline services. The content provider server 110 may be responsible for providing digital images of content to various computing devices of users 142, 144, 146 via a network. The content provider server 110 is coupled to data stores 120 including digital images of content. As will be appreciated by one of ordinary skill in the art, digital images of content may include images of any content in digital form, such as, but not limited to, e-books, electronically published news, electronically published magazines, or the like. A data store, such as the content data store as used herein, is any type, form, and structure of storage in which data is maintained. For example, the data store may maintain data in a database form, such as a relational database, or as images. Any form, type, and structure may be used for maintaining electronic content/information in accordance with one or more embodiments of the present invention. In one embodiment, the data store 120 stores digital images of content in segments of a certain size (e.g., a certain sized page). The data store 120 maintains an entry for each image page of digital content, which can be individually retrieved and searched.

As illustrated in FIG. 1, the content provider server 110 may be connected to one or multiple service providers or online data stores over a communication network, such as an internal network or public network connection. For example, as shown in FIG. 1, the content provider server 110 is connected to service providers 125, including, but not limited to, content originators 130, publisher partners 132, etc. The publisher partners 132 or content originators 130 may provide content to the content provider server 110, which in turn will convert the received content into image pages suitable for the data stores 120. Those skilled in the art will appreciate that the various servers/components depicted in FIG. 1 are illustrative only. As mentioned above, an actual embodiment of a content provider server 110 may be comprised of a single computer or a plurality of discrete, cooperative servers distributed in a communications network. Similarly, the identified components should be viewed as logical components, as each component may be physically embodied on one or more computer systems, as well as combined with other hardware and/or software components not illustrated herein.

Figure 2:
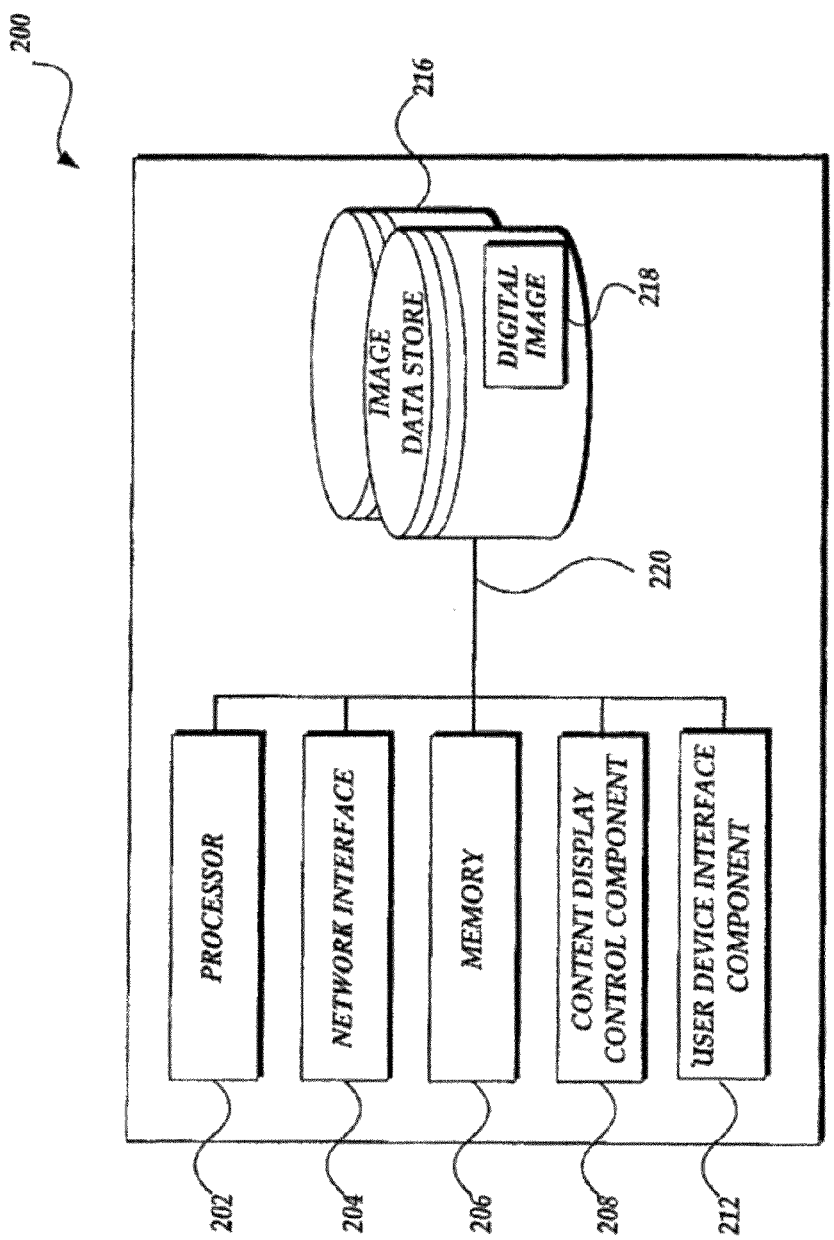
FIG. 2 is a block diagram of a content provider server in accordance with an embodiment of the present invention.

FIG. 2 is a block diagram illustrating exemplary components of a computing device 200 suitable for obtaining and displaying a digital image corresponding to a page of content. However, the following description of the exemplary components of a computing device 200 should be viewed as illustrative only and not construed as limiting in any manner.

With regard to FIG. 2, the exemplary computing device 200 includes a processor 202 in communication with a variety of other components over a system bus 220. These other components include, by way of example, a network interface 204, a user device interface component 212, a content display control component 208, and a memory 206. As appreciated by those skilled in the art, the network interface 204 enables the computing device 200 to communicate data, control signals, data requests, and other information with other resources including computers, data sources, storage devices, and the like, on a computer network such as the Internet (not shown). The network interface 204 may be configured to communicate via wired or wireless connections. As one skilled in the art will appreciate, the computing device 200 may obtain a digital image, such as digital image 218 from content provider server 110, a storage device, or other source via the computer network, as well as save the processed converted content to a networked location or send it to another computer on the network.

The user device interface component 212 receives user interaction via a browser window (e.g., web browser, etc.) on the computing device 200. The user interaction may be received from a variety of input devices including, but not limited to, a digital pen, a touch screen, a keyboard, a mouse, and the like. In addition to the exemplary components described above, a content display control component 208 is used for identifying and obtaining appropriate image pages in response to user interaction. The content display control component may estimate a next set of image pages based on the user interaction such as a scroll movement and obtain the estimated number of image pages from the content service provider in order for the user to smoothly and continuously navigate the image pages.

Figure 3A:
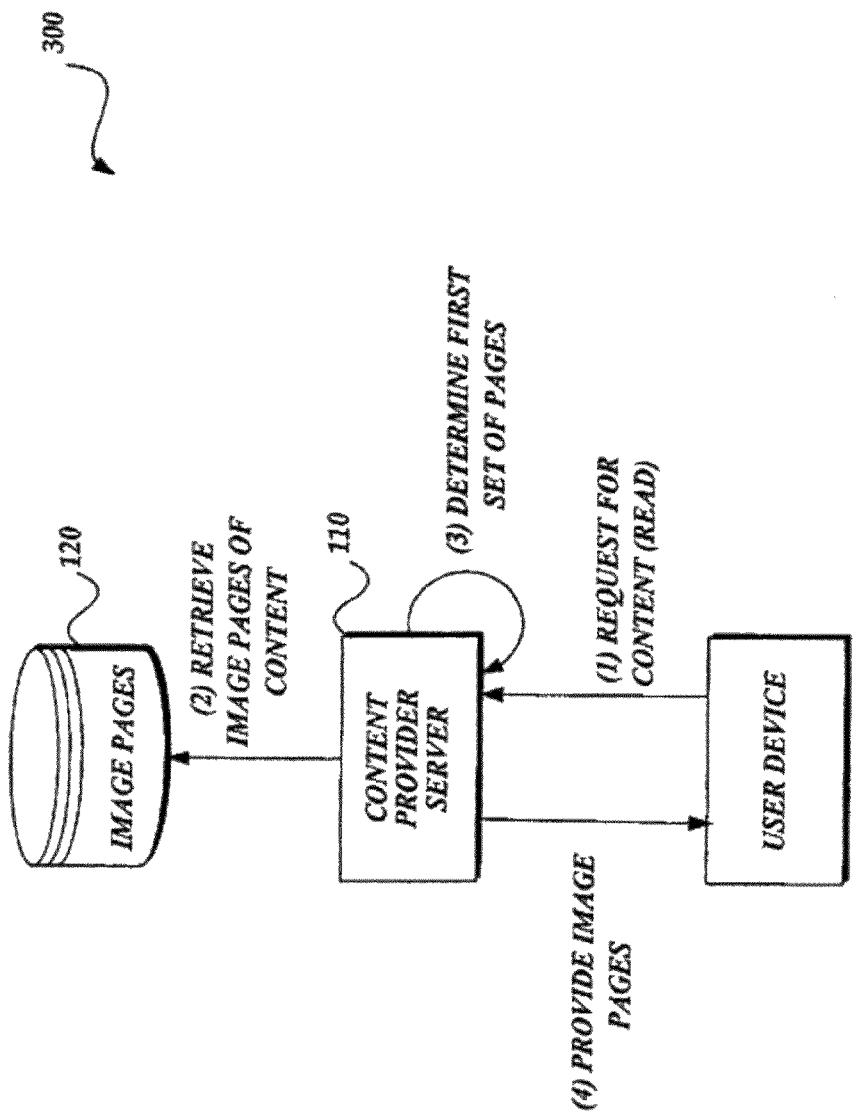
FIGS. 3A-B are pictorial diagrams showing interactions among various components in the content provider server when a user views digital images in accordance with an embodiment of the present invention.
Figure 3B:
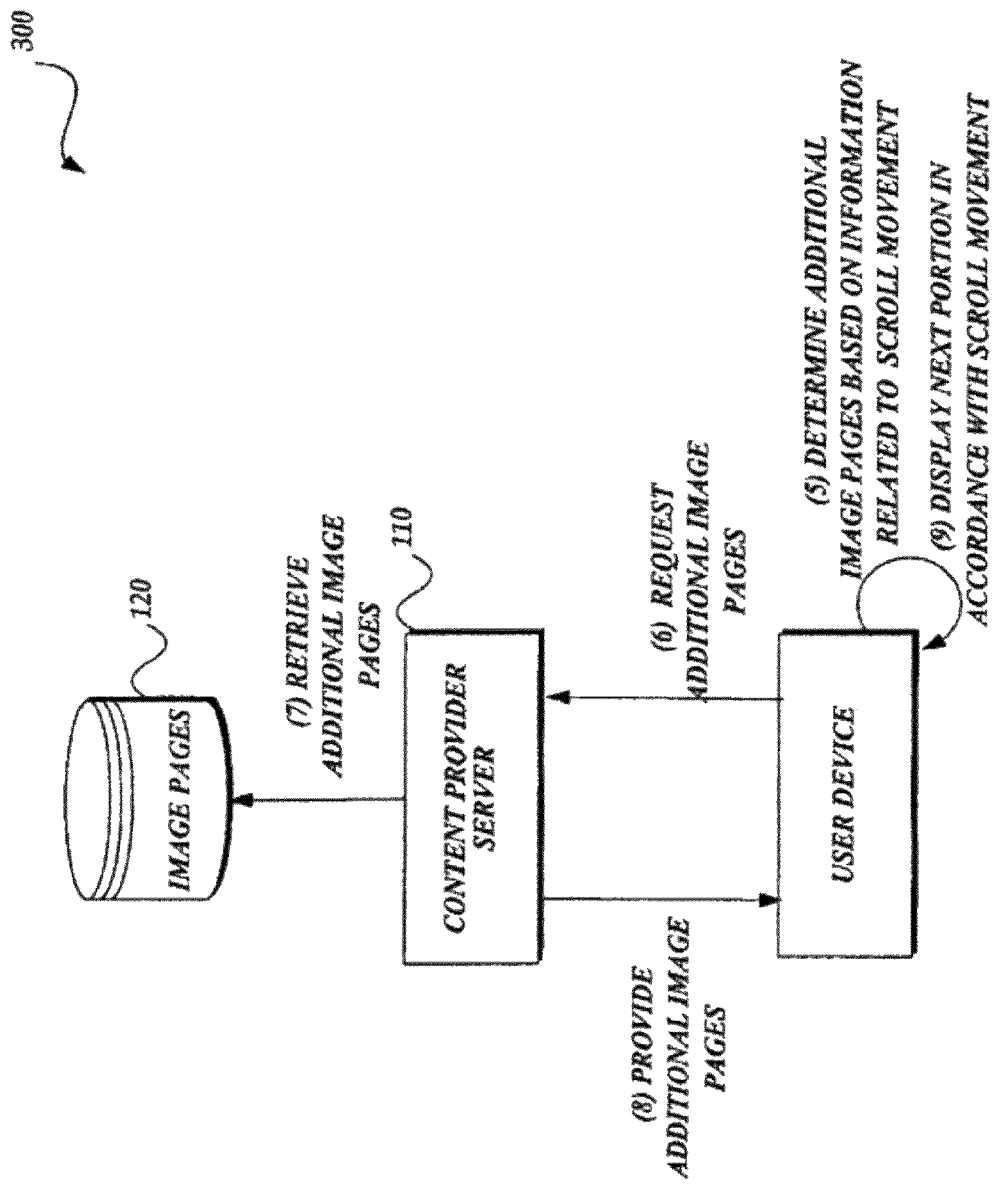

The processor 202 is configured to operate in accordance with programming instructions stored in a memory 206. The memory 206 generally comprises RAM, ROM, and/or other permanent memory. Thus, in addition to storage in read/write memory (RAM), programming instructions may also be embodied in read-only format, such as those found in ROM or other permanent memory. The memory 206 typically stores an operating system for controlling the general operation of the computing device 200. The operating system may be a general purpose operating system such as a Microsoft Windows® operating system, a UNIX® operating system, a Linux® operating system, or an operating system specifically written for and tailored to the computing device 200. Similarly, the memory 206 also typically stores user-executable applications, or programs, for conducting various functions on the computing device 200. The computing device 200 optionally includes an image store 216. The image store 216 stores a limited amount of digital images obtained by the content display control component 208. FIGS. 3A-3B are pictorial diagrams showing interactions between the content provider server 110 (FIG. 1) and a user computing device 142-146 when a user reads the image pages of digital content. For the purpose of discussion, assume that the user has already logged into the content provider server 110 which is configured to provide secured access to digital content such as an e-book, etc. The user also has been verified to access a specific digital content.

Referring to FIG. 3A, assume that the user requests to read the digital content titled the "U.S. CONSTITUTION." In response to the request, the content provider server 110 may retrieve a first few image pages (a first set of image pages) of the digital content, for example, image pages 1, 2, 3, 4, and 5 from the image page data store 120. The number of image pages to retrieve may be determined by the size of each image page so as not to burden the bandwidth of the content provider server 110. In addition, the number of image pages to retrieve may be determined by a threshold number of image pages, which may be predefined based on the size of a temporary memory (e.g., buffer memory, etc.) or the size of the digital content. The retrieved image pages may be downloaded and stored in the temporary memory in a user device for fast display via a Web browser.

If a threshold number of image pages to be downloaded has been specified, the number of downloaded image pages at a given time will not be more than the threshold number. The image pages stored in the temporary memory are utilized so that, within the image pages, the user can move the displayed pages up and down without experiencing any discontinuation. In order to ensure continuous display throughout the entire digital content, the next possible set of image pages is constantly determined and obtained to update the image pages in the temporary memory. In this manner, a user can view image pages of the digital content in a continuous manner while a limited number of image pages are being downloaded at a given time.

As will be discussed in greater detail below, the images pages stored in the temporary memory referred to herein as a "current set of image pages", may be used for continuous display in accordance with scroll movement. In one embodiment, if there is a threshold for the number of image pages to be stored in the temporary memory, some of the previously stored image pages which are no longer needed will be removed from the temporary memory and either deleted or removed to a different memory location.

In FIG. 3A, the first current set of image pages (e.g., image pages 1, 2, 3, 4, and 5) is ready to be displayed to the user. Typically, the first image page of the digital content may be initially displayed. While viewing the first image page, the user can view other image pages by changing the scroll movement, as discussed below. In one embodiment, the user can view other image pages by manipulating a scroll visual indicator 410 (FIG. 4A) displayed within a user interface window in the web browser. As described above, the scroll visual indicator 410 can be manipulated by a mouse, a keyboard, a digital pen, a touch screen, or the like. For example, the user can change the scroll movement up and down with a steady speed by pressing an upper or a lower portion of the scroll visual indicator 410. In addition, the user can drag the scroll visual indicator 410 up and down to indicate a direction and speed of the scroll movement. It is appreciated that any type or shape of visual indicators for scroll movement, such as a scroll bar, a scroll thumb, a scroll elevator, etc., can be utilized in embodiments of the present invention.

Referring to FIG. 3B, when the scroll movement reaches a certain image page, additional image pages may be determined, downloaded, stored in the temporary memory and added to the current set of image pages. Likewise, as the scroll movement changes, it may be determined that image pages which are included in the current set of image pages are no longer needed and are removed from the current set of image pages. For example, if the current set of image pages includes image pages 1, 2, 3, 4, and 5, as the user scrolls through the image pages, for example, scrolls from image page 3 to image page 4, it can be predicted that image page 5 will soon need to be displayed, followed by image pages 6 and 7. Because the current set of image pages stored in the temporary memory does not include image pages 6 and 7, in order to provide the continuous display from image page 5 to the next image pages, image pages 6 and 7 will be downloaded and added to the current set of image pages stored in the temporary memory, thereby making the new current set of image pages. In this manner, image pages 6 and 7 are ready to be displayed before the user begins viewing image page 5. Consequently, the user can experience the continuous display of image pages using the scroll movement, although a limited number of image pages are currently available for the display.

Additionally, to release portions of the temporary memory, it may also be predicted that image pages 1 and 2 are no longer needed because the user is progressing further into content. As a result, image pages 1 and 2 may be removed from the current set of image pages and deleted from the temporary memory, or moved from the temporary memory to another storage location in the user device. Moving image pages that are no longer needed but have been downloaded to another location on the user devices frees up portions of the temporary memory and at the same time keeps the image pages accessible, without the need to download, in the event the user desires to view those image pages again.

In one embodiment, the current location of the scroll movement (the page where the scroll movement is detected) may be compared with the first or last page stored in the temporary memory. If the current location of the scroll movement is close to the first or last page, additional image pages may be identified, downloaded and added to the current set of image pages stored in the temporary memory.

In an illustrative embodiment, a number of image pages which precede or follow from the current location of the scroll movement (the page where the scroll movement is detected) may be predefined and continuously maintained in the current set of image pages stored in the temporary memory. For the purpose of discussion, assume that the current set of image pages includes five image pages including image pages 4, 5, 6, 7, 8, and a ratio of the number of preceding image pages and the number of following pages is required to be 1 to 3. In this scenario, the temporary memory may continuously store one preceding image page, one current image page, and three following image pages based on the direction of the scroll movement. For example, if the current location of the scroll movement moves from image page 5 to image page 6 (i.e., the direction indicates scrolling down), image page 9 will be downloaded and added in the current set of image pages and image page 4 will be removed from the current set of image pages. Consequently, the temporary memory stores image pages 5, 6, 7, 8, and 9. Likewise, if the current location of the scroll movement is detected on image page 6 and the direction indicates scrolling up, image pages 4 and 3 will be downloaded and added in the current set of image pages and image pages 8 and 9 will be removed from the current set of image pages. Consequently, the temporary memory stores image pages 3, 4, 5, 6, and 7.

Figure 4A:
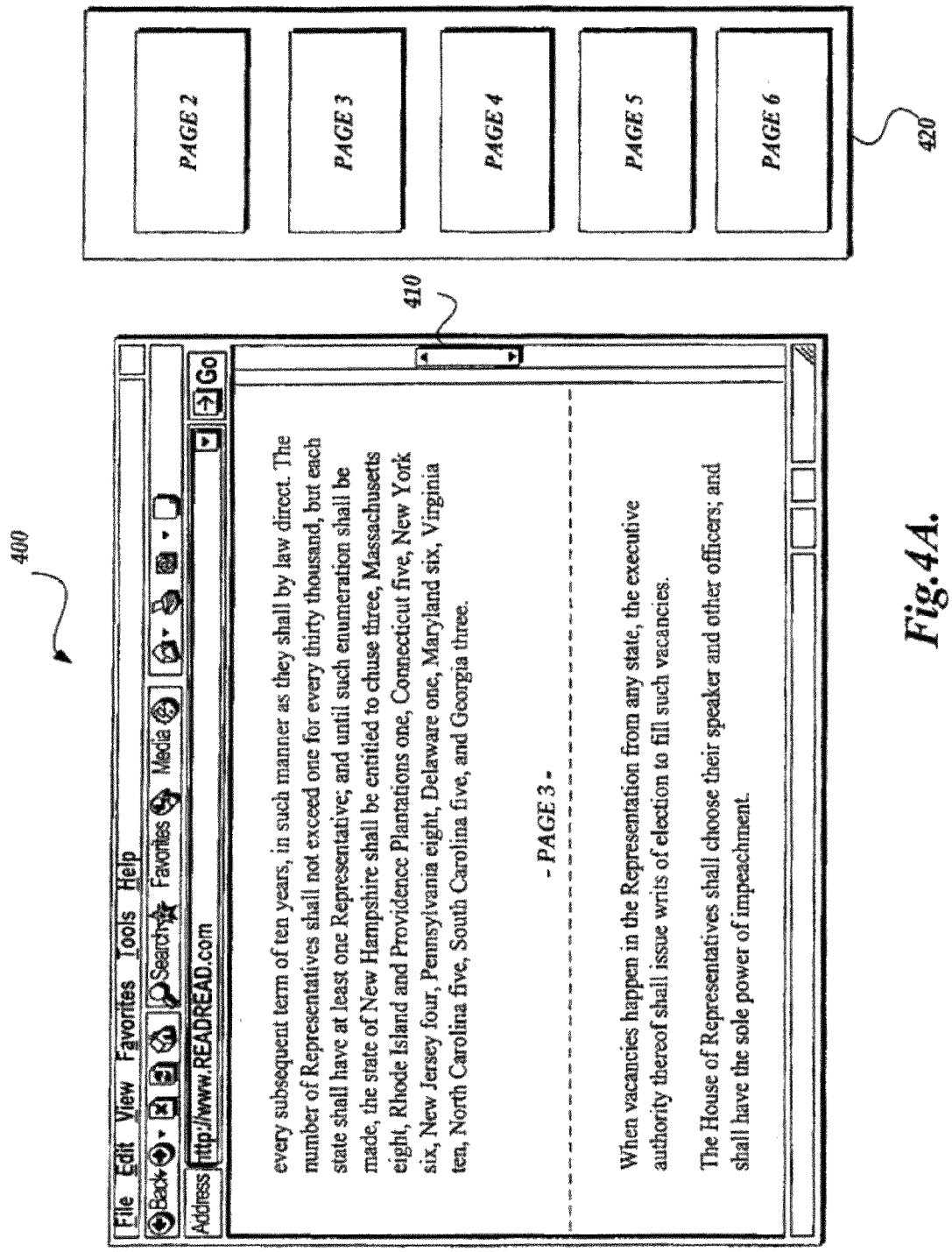
FIGS. 4A-4C are screen displays showing continuous scrolling of downloaded digital images in accordance with an embodiment of the present invention.
Figure 4B:
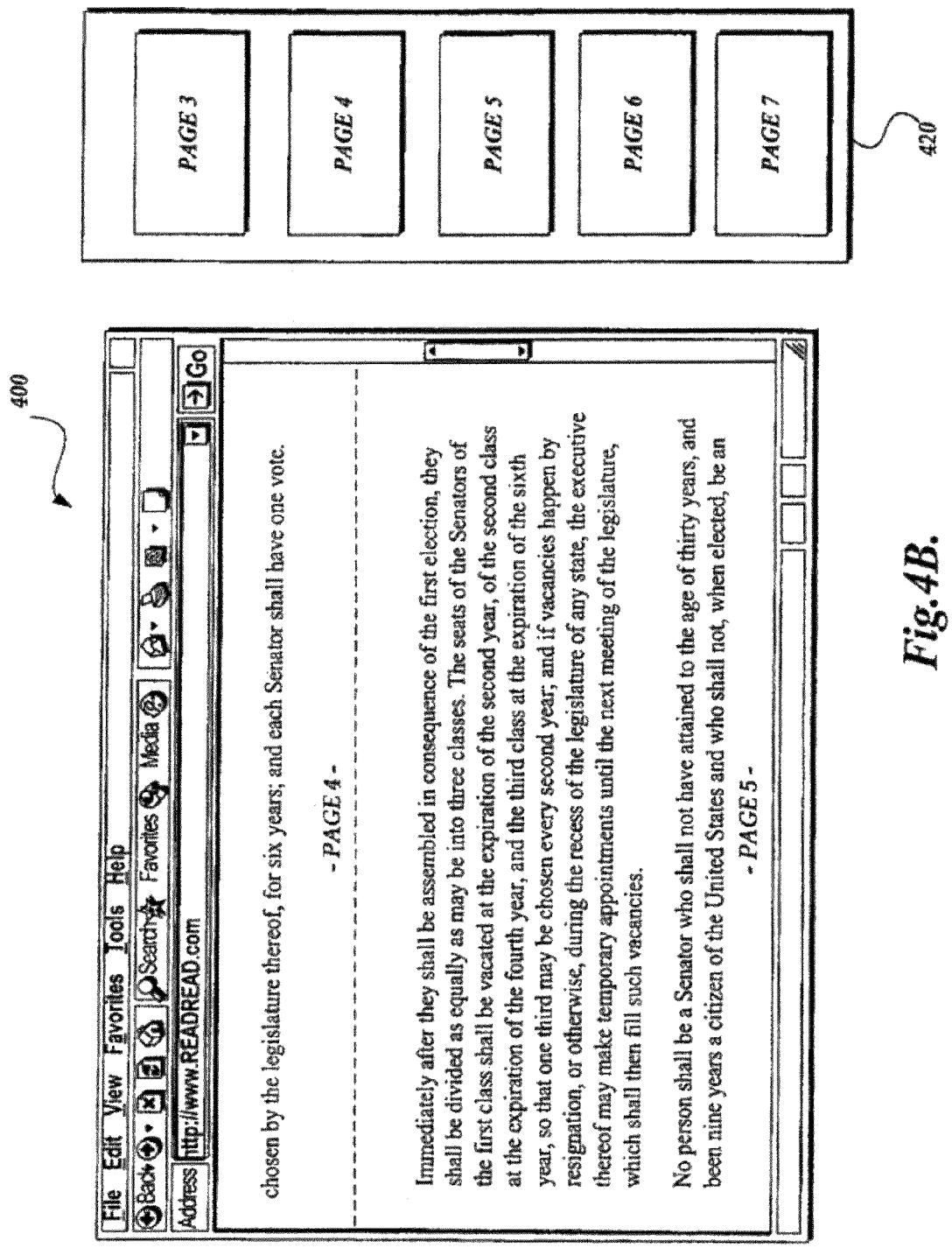
Figure 4C:
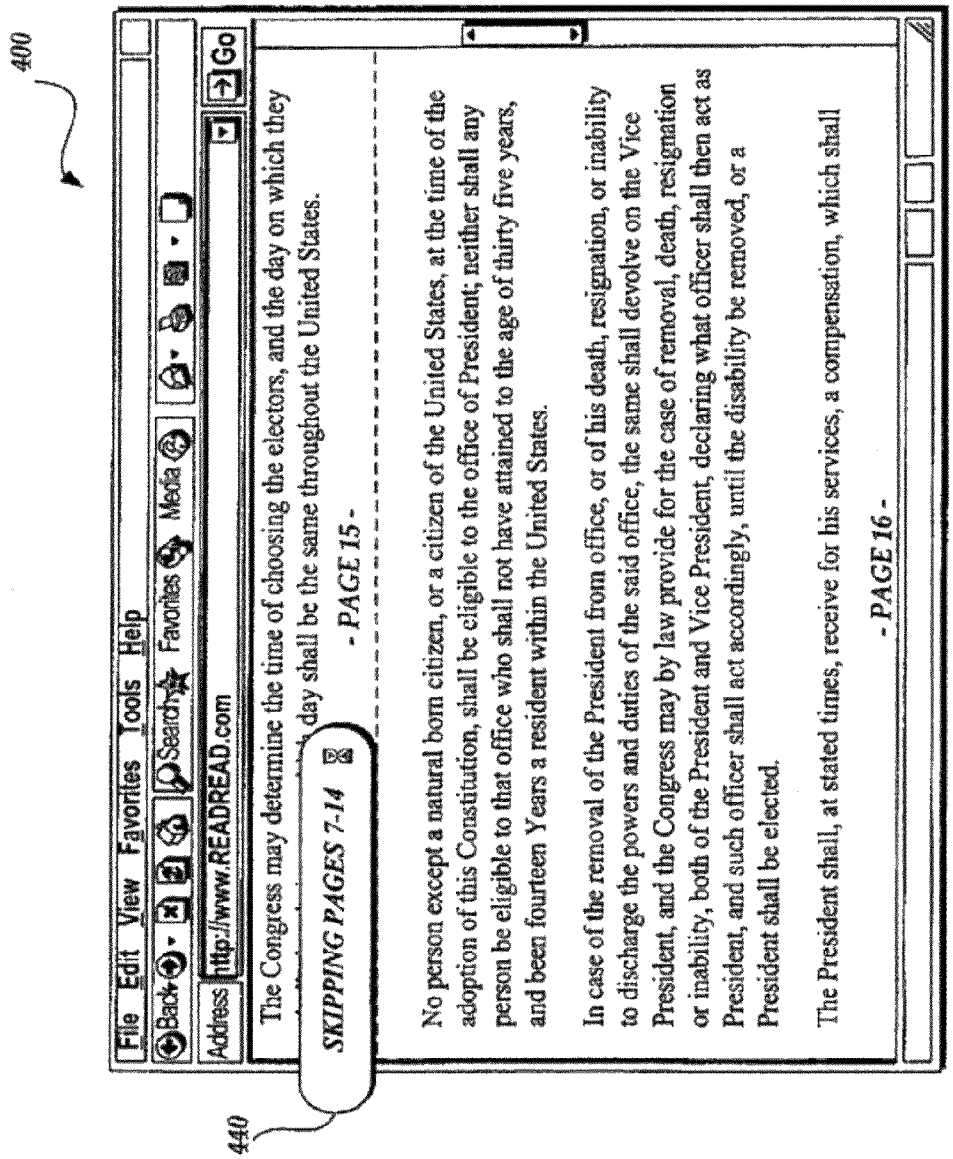

FIGS. 4A-4C are exemplary screen displays 400 showing continuous scrolling of downloaded digital images in accordance with an embodiment of the present invention. For the purpose of discussion, assume that the threshold number of image pages to be stored in the temporary memory is defined as up to 5 image pages at a given time and it is predefined that an equal number of preceding image pages and following image pages from the current scroll movement are to be maintained. One of the examples of the temporary memory may be a buffer memory which is configured to provide fast and smooth delivery of image pages to the web browser. As shown in FIG. 4A, a set of image pages stored in the temporary memory may include image pages 2, 3, 4, 5, and 6, and currently image page 3 and 4 are being viewed by the user. As shown in FIG. 4B, as the user moves from image page 4 to image page 5, new image pages, for example, image page 7, may be determined, downloaded and added to the current set of image pages. Likewise, image page 2 may be removed from the current set of image pages. In this manner, when the user reaches image page 7, additional pages such as image pages 9 and 10 may be determined, downloaded and added to the current set of image pages stored in the temporary memory and image pages 3 and 4 may be removed. As a result of this process, a continuous display is provided without downloading the entire content.

Referring to FIG. 4C, the exemplary screen display 400 is illustrated when the speed of the scroll movement is above a scroll movement threshold. For example, the scroll movement threshold may be a maximum display speed, a maximum download speed, or the like. The maximum display speed is a speed threshold to display image pages to users and the maximum download speed is a speed threshold to download (fetch) image pages from the content provider server 110. If the speed of the scroll movement exceeds or meets the maximum display speed, it may not be reasonable to display each image page in accordance with the scroll movement. Likewise, if the speed of the scroll movement exceeds or meets the maximum download speed, each image page cannot be downloaded or displayed at the speed of the scroll movement since the scroll movement is faster than the download bandwidth which can be sustained. An indicator 440 may display the page number of the image pages that would have been displayed or downloaded at the rate of the speed of the scroll movement.

In one embodiment, when the scroll movement meets or exceeds the scroll movement threshold, the number of image pages to skip will be determined based on the speed and the direction of the scroll movement. When the scroll movement slows down or stops, the image pages to be included in the current set of image pages may be determined and any additional image pages may be obtained to update the current set of image pages. An indicator 440 may notify the user of the skipped page numbers. In an alternative embodiment, the exemplary screen display may scroll empty pages with a page number until the scroll movement slows down or stops.

The embodiments described in conjunction with the screen display of FIGS. 4A-4C are exemplary and are not to be construed as limiting. The number of thresholds and the size of the temporary memory can vary depending on particular implementation embodiments of the present invention. Further, the term, image page is used herein to describe an exemplary logical segment of the digital content which is suitable for individual storing and searching within the data store 120.

Figure 5:
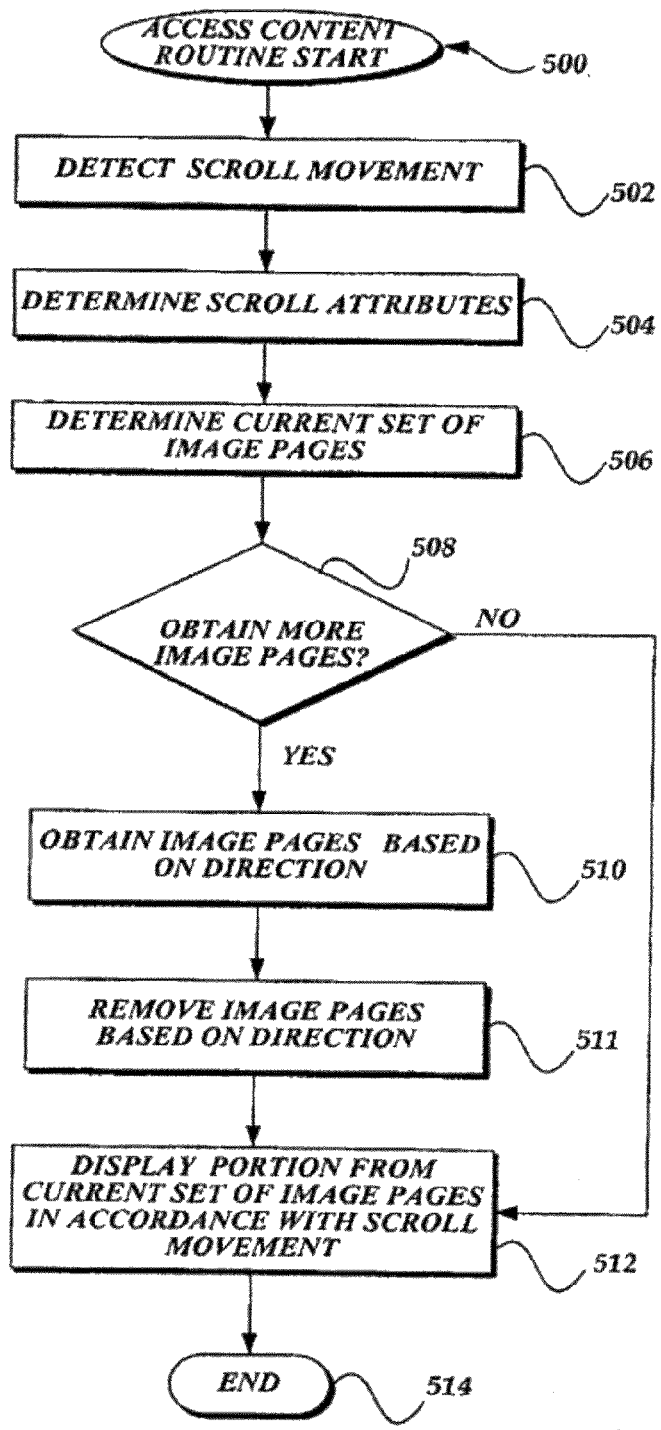
FIG. 5 is a flow diagram of a simple access content routine in accordance with an embodiment of the present invention.

FIG. 5 is a flow diagram illustrating an exemplary routine 500 for accessing content for continuous display of digital content based on scroll movement. As will be appreciated by one of ordinary skill in the art, the scroll movement is a user's interaction to move a document or data in a window display in order to view a particular portion of the data. The scroll movement can be controlled by the mouse, arrow keys on the keyboard, a touch screen, etc. For the purpose of discussion, assume that a user has begun viewing digital content via a display window. A current set of image pages for display may have been already stored in temporary memory. As described above, the current set of image pages includes several image pages which are adjacent to the image page the user is currently viewing. It is to be understood that the current set of image pages are currently available so that, within the current set of image pages, the user can move the displayed image pages up and down without experiencing any discontinuation. Beginning with block 502, scroll movement may be detected within a display window. At block 504, the attributes of the scroll movement, such as a direction, speed, etc. may be determined. In one embodiment, the direction of the scroll movement may be defined as "up" or "down." If the user wants to view a portion of a document which is part of pages prior to the currently displayed page, the user will indicate the scroll movement to be "up." Likewise, if the user wants to view a portion of a document which is part of pages after the currently displayed page, the user will indicate the scroll movement to be "down." Based on the attributes, a current set of image pages for use in continuous display may be determined at block 506.

In one embodiment, a buffer memory or other type of temporary memory may be utilized to temporarily hold a current set of image pages at a given time for fast and efficient access. Generally, the size of a buffer memory is limited. The number of image pages which can be temporarily stored in the buffer memory may also be limited. If the current set of image pages stored in the buffer memory includes all of the determined image pages, no additional image pages will be downloaded. However, if the current set of image pages stored in the buffer memory does not include all of the determined image pages, the additional image pages to be downloaded will be determined and retrieved. At decision block 508, it is determined as to whether additional image pages are to be downloaded and added to the current set of image pages stored in the buffer memory. If it is determined at decision block 508 that the additional image pages are to be downloaded, at block 510 the additional image pages will be downloaded and included in the current set of image pages.

In addition to adding image pages to the current set of image pages based on scroll movement, at block 511 image pages may also be removed from the current set of image pages based on scroll movement. As a result of the addition of image pages and removal of images pages, the current set of image pages stored in the buffer memory does not exceed a threshold of image pages or exceed the buffer memory size, while at the same time making multiple pages continuously viewable based on user actions (e.g., scroll movement).

After downloading additional image pages (at block 510) and removing image pages (block 511) or if it is determined at decision block 508 that the additional image pages are not to be needed, the routine proceeds to block 512 where a portion of the current set of image pages may be displayed in accordance with the scroll movement and the speed. The routine 500 completes at block 514.

Figure 6:
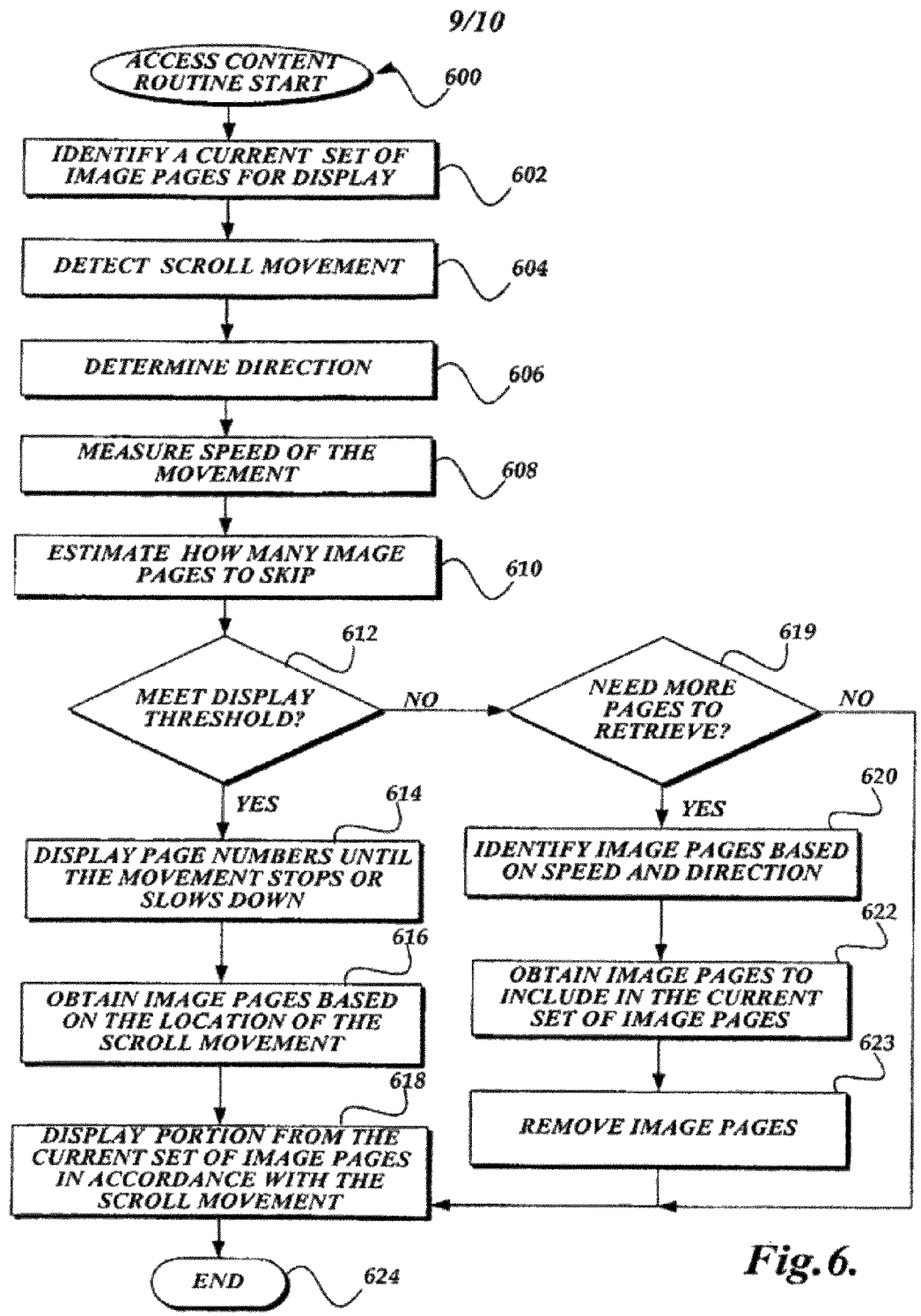
FIG. 6 is a flow diagram of another access content routine in accordance with an embodiment of the present invention.

FIG. 6 is a flow diagram illustrating another exemplary routine 600 for accessing content for continuous display, of digital content based on user interaction. Beginning with block 602, a current set of image pages for browser display may be identified based on the location of a scroll visual indicator, such as a scroll bar. At block 604, the scroll movement may be detected while a portion from the current set of image pages is displayed. At block 606, the direction of the scroll movement may be determined. In one embodiment, the direction of the scroll movement may be defined as "a page up," "a page down," "skip pages up," or "skip pages down." If the user wants to view a portion of the document which is part of pages prior to the currently displayed page within the browser window, the user will indicate the scroll movement to be "a page up." Likewise, if the user wants to view a portion of the document which is part of pages prior to the currently displayed page, but desires to jump to a certain page, the user will indicate the scroll movement to be "skip pages up." In one embodiment, the scroll movements "skip pages up" and "skip pages down" may be automatically determined based on a speed of the scroll movement. In an alternative embodiment, instead of using the scroll movement, the user can manually enter a specific page number to jump to via input boxes within the browser window.

At block 608, the speed of the scroll movement may be measured. At block 610, the number of image pages to skip may be estimated based on the direction and the speed of the scroll movement. At decision block 612, a determination is made as to whether the speed of the scroll movement has met a display threshold. As with FIG. 4C, the display threshold is the maximum display speed which is to be maintained in order to display image pages viewable by users. If the scroll movement meets or exceeds the display threshold, it may not be reasonable to display each image page in accordance with the scroll movement. Thus, these image pages to be skipped may not need to be obtained. If it is determined at decision block 612 that the speed of the scroll movement meets the speed threshold, at block 614, the page numbers of the skipped image pages will be presented to the user until the scroll movement stops or slows down. In this manner, the user can access information about how many image pages have been skipped and determine on which image page to stop or slow down. At block 616, a set of image pages may be identified based on the current location of the scroll movement, obtained and added to the current set of image pages stored in the buffer memory. The obtained set of image pages may replace or add to the image pages contained in the current set of image pages based on the location of the scroll movement. At block 618, a portion from the current set of image pages may be continuously displayed to the user in accordance with the scroll movement.

If it is determined at decision block 612 that the speed of the scroll movement does not exceed or meet the speed threshold, at another decision block 619, a determination is made as to whether the current set of image pages should be updated with additionally downloaded image pages. If it is determined at decision block 619 that the current set of image pages should be updated with additional image pages, at block 620 the additional image pages to be obtained and included in the current set of image pages may be identified based on the direction and speed of the scroll movement. At block 622, the identified image pages may be obtained and the current set of image pages will be updated with the additional image pages. Additionally, at block 623 image pages may be removed from the current set of image pages based on the direction and speed of the scroll movement. At block 618, a portion from the current set of image pages may be displayed in accordance with the scroll movement. The routine 600 completes at block 624.

FIG. 7 is a flow diagram illustrating an exemplary routine 700 for "automatic scrolling" of digital content. "Automatic scrolling" as used herein is user interaction to automatically move image pages of digital content toward one direction on a display window without requiring continued scrolling by the user. Beginning with block 702, a user indication of automatic scrolling may be received. The user indication may be received via a mouse, keyboard, a menu selection from a graphical user interface, etc. In response to the user indication, a desirable speed for the automatic scrolling may be measured at block 704. For example, if a user moves a scroll visual indicator with a certain steady speed for a period of time, that speed may be measured as the desirable speed for automatic scrolling. Alternatively, a user may specify a desired speed such as "fast," "medium," or "slow." While measuring the speed, the direction of the scroll movement may also be determined.

At block 706, a current set of image pages will be determined based one the speed and the direction. As described above, the current set of image pages includes several image pages which are adjacent to the image page the user is currently viewing. The current set of image pages may be stored in temporary memory so that, within the current set of image pages, the user can move the displayed image pages up and down without experiencing any discontinuation, thereby providing continuous viewing without the need to download the entire digital content. In order to ensure continuous display throughout the entire digital content without downloading the entire digital content, the next possible set of image pages is constantly determined and obtained to update the current set of image pages. In this manner, the scroll movement will not reach the last or the first image page of the current set of image pages unless the currently displayed page is the first or the last image page of the digital content. At decision block 708, a determination is made whether more image pages other than the image pages included in the current set of image pages are necessary to keep up the automatic scrolling. If it is determined at decision block 708 that more image pages are necessary, at block 710 the necessary image pages are retrieved and added to the current set of image pages. Additionally, at block 711, image pages that are no longer needed may be removed form the current set of image pages. After retrieving the necessary image pages, removing the unnecessary image page, or if it is determined that no more image pages are necessary, at block 712 a portion of the current set of image pages may be displayed in accordance with the measured speed and the detected direction.

At decision block 714, a determination is made as to whether the user wishes to stop the automatic scrolling. If the user does not wish to stop the automatic scrolling, at decision block 716, a determination is made as to whether there is a change in the speed and/or direction of automatic scrolling. If there is a change in the speed and/or direction of the automatic scrolling, the routine 700 will return to block 704 where the desirable speed and/or direction are measured again. The routine 700 will repeat the above mentioned steps. If the user wants to continue the automatic scrolling with the current speed and direction, the routine returns to a decision block 708 and continues. The routine 700 will repeat the above mentioned steps until an end of the document is reached or the user stops automatic scrolling (block 714). If the user wishes to stop the automatic scrolling, the current image page will remain displayed on the browser window and the routine 700 completes at block 718.

While illustrative embodiments have been illustrated and described, it will be appreciated that various changes can be made therein without departing from the spirit and scope of the invention.

What is claimed is:

1. A computer-implemented method for displaying image pages of digital content which is available over a network, the computer-implemented method comprising:
   as implemented by one or more computing devices configured with specific executable instructions,
      obtaining over the network a current set of image pages from the digital content, said current set of image pages comprising a subset of image pages of the digital content;
      obtaining a user request to display at least a portion of a new image page of the digital content, wherein the request is based on an indication of scroll movement, wherein the new image page has not yet been requested over the network and is not included in the current set of image pages prior to obtaining the user request;
      in response to obtaining the user request, sending a request over the network to obtain additional image pages, wherein the additional image pages comprise the requested new image page and at least one image page immediately following the new image page; and
      obtaining over the network the additional image pages to include in the current set of image pages, wherein the additional image pages to include in the current set of image pages are determined based at least in part on a direction and speed of the scroll movement, wherein at least one intervening image page in the digital content between the current set of image pages and the new image page is not included in the additional image pages.

2. The computer-implemented method of claim 1, further comprising displaying continuous portions of image pages of the current set of image pages in accordance with the user request.

3. The computer-implemented method of claim 1, wherein the additional image pages further comprise at least one image page immediately preceding the new image page.

4. The computer-implemented method of claim 1, wherein the user request is received from a touch screen device.

5. The computer-implemented method of claim 1, wherein a size of the current set of image pages is determined by a size of temporary memory available to store the current set of image pages.

6. The computer-implemented method of claim 1, wherein the user request corresponds to a jump to a given image page from the digital content.

7. The computer-implemented method of claim 1, wherein the at least one intervening image page is not included in the current set of image pages and is not obtained over the network, said at least one intervening image page preceding the new image page.

8. The computer-implemented method of claim 1, further comprising removing image pages from the current set of image pages.

9. The computer-implemented method of claim 1, wherein a predetermined number of image pages is defined for the current set of image pages and image pages are included in and removed from the current set of image pages so as not to exceed the predetermined number of image pages.

10. The computer-implemented method of claim 9, wherein the predetermined number of image pages comprises a predetermined number of image pages preceding the new image page and a predetermined number of image pages following the new image page.

11. A display system for providing a continuous user viewing experience of digital content which is available over a network, the display system comprising:
   a user interface component configured to receive a user input with respect to a portion of digital content to view, wherein the user input corresponds to a user request to display at least a portion of a new image page of the digital content, wherein the request is based on an indication of a movement; and
   a content display control component configured to:
      obtain over the network a current set of image pages from the digital content, said current set of image pages comprising a subset of image pages of the digital content;
      in response to the user interface component receiving the user request to display at least a portion of a new image page of the digital content, determining whether the new image page has been requested over the network and is included in the current set of image pages prior to receiving the user request;
      when the determination is that the new image page has not yet been requested over the network and is not included in the current set of image pages:
         sending a request over the network to obtain additional image pages, wherein the additional image pages comprise the new image page and at least one image page immediately following the new image page; and
         obtaining over the network the additional image pages to include in the current set of image pages, wherein at least one intervening image page in the digital content between the current set of image pages and the new image page is not included in the additional image pages, wherein the at least one intervening image page that is not included in the additional image pages is determined based at least in part on a speed of the movement.

12. The display system of claim 11, wherein the content display control component is configured to display portions of the current set of image pages in accordance with the user input.

13. The display system of claim 11, wherein the user input is received via a displayed visual indicator.

14. The display system of claim 11, wherein the user input is received via a displayed scroll bar.

15. The display system of claim 11, wherein the user input is received from a touch screen device.

16. The display system of claim 11, wherein the additional image pages further comprise at least one image page immediately preceding the new image page.

17. The display system of claim 11, wherein a size of the current set of image pages is determined by a size of temporary memory available to store the current set of image pages.

18. The display system of claim 11, wherein the user request corresponds to a jump to a given image page from the digital content.

19. The display system of claim 11, wherein the at least one intervening image page is not included in the current set of image pages and is not obtained over the network, said at least one intervening image page preceding the new image page.

20. The display system of claim 11, wherein a predetermined number of image pages is defined for the current set of image pages and image pages are included in and removed from the current set of image pages so as not to exceed the predetermined number of image pages.

21. The display system of claim 20, wherein the predetermined number of image pages comprises a predetermined number of image pages preceding the new image page and a predetermined number of image pages following the new image page.

22. A non-transitory computer-accessible medium having computer-executable components encoded thereon that are configured to provide continuous display of digital content obtained over a network, the components comprising:

a user input component configured to receive a user input with respect to a portion of digital content to view, wherein the user input corresponds to a user request to display at least a portion of a new image page of the digital content, wherein the request is based on an indication of a movement; and a content display control component configured to:
obtain over the network a current set of image pages from the digital content, said current set of image pages comprising a subset of image pages of the digital content;
in response to the user interface component receiving the user request to display at least a portion of a new image page of the digital content, determining whether the new image page has been requested over the network and is included in the current set of image pages prior to receiving the user request;
when the determination is that the new image page has not yet been requested over the network and is not included in the current set of image pages:
sending a request over the network to obtain additional image pages, wherein the additional image pages comprise the new image page and at least one image page immediately following the new image page; and
obtaining over the network the additional image pages to include in the current set of image pages, wherein the additional image pages to include in the current set of image pages are determined based at least in part on a speed of the movement, wherein at least one intervening image page in the digital content between the current set of image pages and the new image page is not included in the additional image pages.

23. The non-transitory computer-accessible medium of claim 22, wherein the content display control component is configured to display portions of the current set of image pages in accordance with the user input.

24. The non-transitory computer-accessible medium of claim 22, wherein the additional image pages further comprise at least one image page immediately preceding the new image page.

25. The non-transitory computer-accessible medium of claim 22, wherein the at least one intervening image page is not included in the current set of image pages and is not obtained over the network, said at least one intervening image page preceding the new image page.

26. The non-transitory computer-accessible medium of claim 22, wherein a predetermined number of image pages is defined for the current set of image pages and image pages are included in and removed from the current set of image pages so as not to exceed the predetermined number of image pages.

27. The non-transitory computer-accessible medium of claim 26, wherein the predetermined number of image pages comprises a predetermined number of image pages preceding the new image page and a predetermined number of image pages following the new image page.

\* \* \* \* \*